United States Patent [19]

Sunnen et al.

[11] Patent Number: 4,886,157
[45] Date of Patent: Dec. 12, 1989

[54] WORKPIECE DELIVERY MAGAZINE

[75] Inventors: Robert M. Sunnen; Frank E. Vanderwal, both of Frontenac; Richard S. Jackson, Crestwood, all of Mo.

[73] Assignee: Sunnen Products Company, St. Louis, Mo.

[21] Appl. No.: 98,549

[22] Filed: Sep. 21, 1987

[51] Int. Cl.$^4$ ............................................. B23Q 7/04
[52] U.S. Cl. ............................... 198/839; 198/803.12; 198/806; 198/487.1; 51/215 E
[58] Field of Search ............ 51/215 E, 215 M, 215 R; 198/806, 831, 987.1, 803.12, 816, 839, 861.1

[56] References Cited

U.S. PATENT DOCUMENTS

| | | | |
|---|---|---|---|
| 2,829,760 | 4/1958 | Herman | 198/803.12 |
| 3,118,315 | 1/1964 | Loosli | 198/816 |
| 3,300,019 | 1/1967 | Brigham | 198/487.1 |
| 3,766,851 | 10/1973 | Sirvet | 198/487.1 |
| 3,915,288 | 10/1975 | Szpitalak | 198/803.12 |
| 4,009,776 | 3/1977 | Shrypek | 198/987.1 |
| 4,072,227 | 2/1978 | Nomura | 198/487.1 |
| 4,641,740 | 2/1987 | Grecksch | 198/487.1 |

FOREIGN PATENT DOCUMENTS

419363 10/1974 U.S.S.R. ...................... 51/215 E

*Primary Examiner*—Frederick R. Schmidt
*Assistant Examiner*—Blynn Shideler
*Attorney, Agent, or Firm*—Haverstock, Garrett & Roberts

[57] ABSTRACT

An apparatus for supporting workpieces while feeding them into position to have a surface thereof operated on by a machine tool such as a honing material rotatable about an axis including a support assembly having a canted wall structure located to be intersected at an intermediate location by the axis of rotation of the tool, a plurality of spaced sprocket assemblies mounted on the canted wall structure each having a pair of space sprocket gears, an endless chain assembly mounted on the sprocket assemblies for movement when the sprocket assemblies rotate, a reach of the chain assemblies extending adjacent to where the axis of the tool intersects the canted wall structure, at least one elongated workpiece support member extending transversely through and from one side of the chain assembly substantially normal to the canted wall structure for supporting a workpiece to be fed, and mechanism for laterally displacing a portion of the chain assembly in the reach thereof that extends adjacent to where the axis of the tool intersects the wall structure whereby the elongated workpiece support member thereat is moved from a position normal to the canted wall structure to a position parallel to the axis of the tool so that the workpiece supported thereby can be moved off of the support member and into a support fixture or onto the rotatable tool.

18 Claims, 7 Drawing Sheets

WORKPIECE DELIVERY MAGAZINE

BACKGROUND OF THE INVENTION

There are in existence many different kinds of honing machines and other machine tools which include rotating members or mandrels used for machining or honing cylindrical surfaces in workpieces and the like. In the past it has been the practice to individually hand feed workpieces or parts to the tool or mandrel and in some cases an operator may even hold the parts while they are being machined or honed. This has been time consuming, dangerous and tedious work and it has made the machining and honing of workpieces expensive. Various attempts have been made to feed automatically or semi-automatically to a honing mandrel or to a machine tool or to a holding device used in association therewith and various feeding devices and holding devices have been devised and used in the past with limited success. More particularly, none of the known devices is able to store a supply of workpieces to be honed or machined in an orderly manner and produce a steady flow of the workpieces to the tool or mandrel unless the workpieces were of the same size and shape. Also, the known devices have required custom made means for holding and orienting the workpieces axially with the tool or mandrel prior to being placed thereon or into a holding device therefor so that they can be moved to honing or machining position without interference from other machine parts. Still further, no known device is able to be adjusted conveniently to accurately align and orient workpieces of widely varying size and shape for positioning to be honed or machined, in such a way as to be practical for small lot production.

SUMMARY OF THE INVENTION

The present device provides means for holding a plurality of workpieces to be honed or machined in succession whereby the workpieces are transported, single file, into position to be moved onto a honing mandrel or tool into a fixture for supporting them during honing or machining. The present invention as disclosed includes a support assembly having a canted machine wall located to be intersected at an intermediate location by the axis of the tool or mandrel. The canted wall generally slopes away from the machine from bottom to top at an angle of about 10° or so. The mechanism for loading, supporting and moving a plurality of workpieces is supported on two vertically spaced plate members which are located adjacent to the canted wall. The plates are adjustable relative to each other and generally, the bottom wall is adjusted downward when the top wall is being adjusted in an upward direction and vice versa. This adjustment enables the device to be able to accommodate workpieces of different sizes.

The present device also includes means for supporting the workpieces in a manner which makes it difficult if not impossible for workpieces to fall off or come loose during transporting due to machine vibration and otherwise, and yet includes means to accurately orient each workpiece as it comes into position to be moved onto the tool or mandrel or into the support fixture therefor. More specifically, in the embodiment disclosed the upper plate supports a pair of spaced sprockets of a chain assembly which are journaled thereto for rotation. The lower plate likewise supports a sprocket member which is journal thereto, and a pair of fixed spaced sprockets are also joined to the wall structure. Extending around the sprockets is a continuous chain assembly formed by two identical spaced endless chains. The chains are supported on the sprocket assemblies and are arranged to be in the same plane as the canted wall or at an angle of about 10° to vertical. Openings where adjacent links of the chains are connected provide aligned openings sized to receive pins which extend therefrom and are used to support workpieces as they are carried and transported thereby during operation. This means that all of the pins that extend through aligned chain openings with some exception as noted are tilted upwardly slightly relative to horizontal over most of their travel. Thus, the workpieces being carried will move toward the chain assembly where they will not be able to work loose and fall off.

In addition and importantly, two additional sprockets are provided which have their respective teeth oriented to be vertical rather than in the plane of the canted wall. The teeth of one of these engages the upper reach of one chain from above and the teeth of the other sprocket engage the upper reach of the other chain from below to place the center portions of the upper chain reaches in horizontal alignment. This causes some angular twisting of the respective chains so that the support pin at the center of the upper chain reaches and the workpiece being supported will be horizontally oriented. This enables this workpiece to be gripped and removed while in horizontal position or to be moved off of this pin for movement into honing position on the mandrel or the like as required.

Thus, the present device is adjustable to accommodate workpieces of different sizes, shapes, and diameters, requires minimum operator attention except for loading or preloading and orients the workpieces when they are in position to be removed. Once the operator loads a supply of workpieces nothing further need be done by the operator until the supply of workpieces becomes exhausted or nearly exhausted in which case the operator can reload the pins with a fresh supply so the operation can proceed without interruption. The subject device also lends itself to use with automatic or computer controlled honing devices such as the computer controlled honing device disclosed in copending Davis et al U.S. patent application Ser. No. 100,726, filed Sept. 25, 1987 assigned to Applicant's Assignee.

It is a principal object of the present invention to provide improved means for maintaining a supply of workpieces to be honed or machined and for feeding the workpieces, one at a time, into position to be honed or machined by a honing mandrel or like device.

Another object is to provide a workpiece loading and feeding assembly which can be incorporated as part of a honing or machining device and which includes means for supporting and feeding a plurality of workpieces and for successively positioning each workpiece in alignment with the honing mandrel, working tool, or with a holder device therefor so that it can automatically be pushed into or supported in honing position.

Another object is to provide workpiece feeding means which are adjustable to accommodate parts of different sizes, shapes and diameters.

Another object is to provide means for delivering workpieces including odd shaped workpieces to a transfer position such that all of the workpieces of like kind are oriented by gravity with the heavy portion extending downwardly.

Another object is to provide a workpiece feeding device which is constructed to minimize the possibility that a workpiece will fall off its support while being fed.

Another object is to minimize the amount of work that a honing or other machine tool operator has to do in order to feed workpieces to the machine.

Another object is to make it relatively easy to adjust a feed mechanism for feeding workpieces to a machine operation so as to be able to accommodate workpieces of different sizes and shapes and workpieces having surfaces of different diameters and lengths to be operated on.

Another object is to more fully automate honing and other similar machine tools.

Another object is to provide workpiece feeding means that do not require custom made or modified work holding means to support and transport the workpiece.

Another object is to provide workpiece feeding means which because of their fast and convenient adjustments makes it practical to automatically feed small lots of workpieces to a machine tool.

Another object is to maintain tension on chains used to support workpieces when locating a workpiece for removal therefrom in order to maintain the orientation of the workpiece.

Another object is to extend the chains used to support workpieces so that they can extend even to a remote location for loading.

Another object is to provide a unique way for changing the workpiece carrying capacity of a mechanism for feeding workpieces to a honing or other machine tool.

Another object is to provide a workpiece feed device that uses parallel feed chains and associated connectors for supporting workpiece support members.

Another object is to provide unique means for accurately orienting workpieces to be fed into position to be honed or machined.

These and other objects and advantages of the present invention will become apparent after considering the following detailed specification of a preferred embodiment thereof in conjunction with the accompanying drawings wherein:

DETAILED DESCRIPTION OF THE PREFERRED EMBODIMENT

Figure 1:
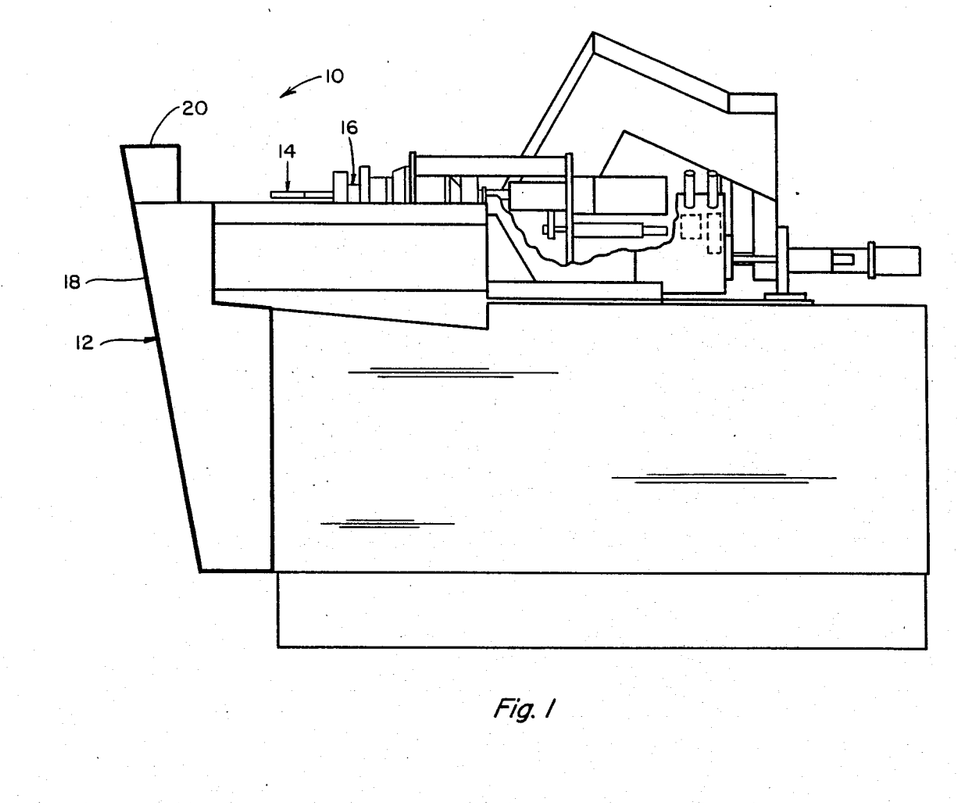
FIG. 1 is a side elevational view of a honing machine having workpiece magazine type loading and feeding mechanisms thereon shown in darkened outline and constructed according to the present invention.

Referring to the drawings more particularly by reference numbers, number 10 in FIG. 1 refers to a machine such as a honing machine having a workpiece loading and feeding mechanism 12 mounted on the front end thereof. The workpiece feeding and loading mechanism 12 is mounted in front of the honing mandrel assembly 14 which is the assembly that does the honing. The mandrel assembly 14 is mounted in a support structure or spindle nose 16 for rotation during honing. The mechanism 12 is the subject matter of the present invention and is embodied in the structure shown in bold outline in FIG. 1. It is anticipated that the same loading and feeding mechanism could also be used with other types of machine tools as well.

Figure 2:
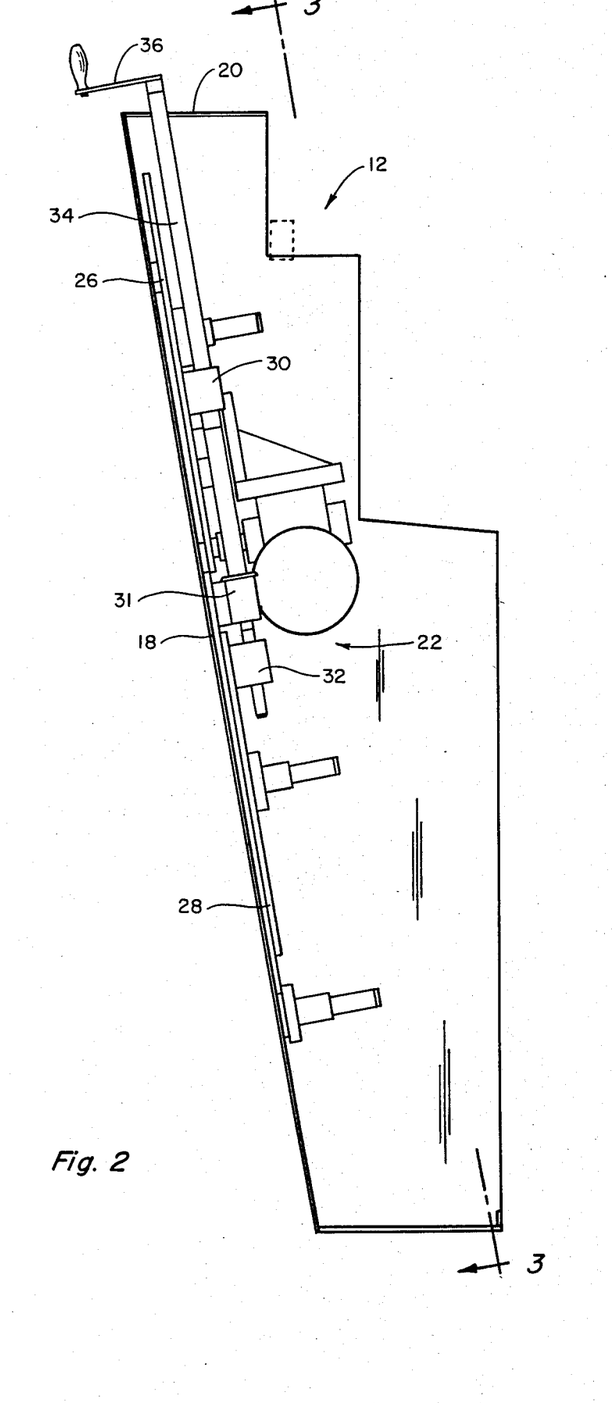
FIG. 2 is an enlarged cross-sectional view taken through an intermediate of the magazine loading and feeding assembly FIG. 1.

FIG. 2 is a cross-sectional view taken through the loading and supporting magazine assembly 12. It should be noted that the wall 18, which is also the front wall of the honing machine 10 as shown, slopes away from the machine from bottom to top at an angle shown as about 10°, and this is important to the present invention as will be explained. The sloping wall 18 is also shown connected to an overhanging top wall portion 20 which serves to further partially conceal the mechanism contained therein. The entire assembly 12 including the closure walls therefor can be hingedly mounted on the machine 10 by suitable hinge means which allow it to swing out for access and loading.

Contained within the walls 18 and 20 are mechanism 22 for loading, supporting, and moving a plurality of workpieces such as workpiece 24. Most of the mechanism for the assembly 22 is supported on two vertically spaced plate members 26 and 28 which are located adjacent to the sloping wall 18. The plate 26 has a threaded block 30 mounted on it and similarly the plate 28 has a threaded block 32 attached thereto. The threaded blocks 30 and 32 have aligned threaded bores through which differently and oppositely threaded portions of a rod 34 extend. The rod 34 passes through and is supported and journaled in a fixed block 31 which allows for rotation but not axial movement of the rod 34. The rod 34 also extends upwardly through the top wall member 20 where a crank member 36 is attached to the upper end thereof. The crank 36 can be rotated in either opposite direction to displace the block portions 30 and 32 and the plates 26 and 28 attached thereto to move the plates 26 and 28 closer together or further apart. In this regard refer to FIG. 3 wherein the plate 26 is shown supported for movement relative to the wall 18 by elongated slots or openings 38 and 40 each of which receives a threaded member 42 attached to the wall 18 and a washer member 44 for holding the plate in place yet permitting it to move vertically when the crank 36 is rotated. In like manner, the lower plate 28 has slots 46 and 48 which similarly receive threaded members 50 attached to the wall 18 and washers 52 to permit it also to move vertically in the plane of the wall 18.

The upper plate 26 supports a pair of spaced sprockets or gear assemblies 54 and 56 which are journaled thereto for rotation by journal means 58 and 60 respectively. The plate 28 likewise supports a sprocket member 62 which is journaled thereto by journal means 64. A fixed cross-bar 66 is attached extending acoss a lower portion of the wall 18 and it supports another pair of spaced sprockets 68 and 70 which are journaled thereto by journal means 72 and 74 respectively. Thus, it can be seen that when the crank 36 is rotated to move the plates 26 and 28 vertically and in opposite directions relative to each other, because the threaded blocks 30 and 32 and associated shaft portions are oppositely threaded, the sprockets 54 and 56 move with the plate 26 while the sprocket 62 moves in an opposite direction with the plate 28, and the sprockets 68 and 70 remain in fixed positions.

Extending around the sprockets 54, 56, 62, 68 and 70 is a continuous sprocket chain assembly identified generally by number 76. The assembly 76 is formed by two identical spaced endless chains 78 and 80 shown more clearly in FIG. 6. All of the sprocket assemblies 54, 56, 62, 68 and 70 are formed by two spaced sprocket gear portions as clearly shown in regard to the sprocket 56 in FIG. 4. The separate gear portions of the sprocket 56 are shown identified as tooth portions 56A and 56B. Each of these tooth portions engages a length of one of the respective endless chains 78 and 80 as explained above. The same is true of the other sprocket assemblies.

Figure 6:
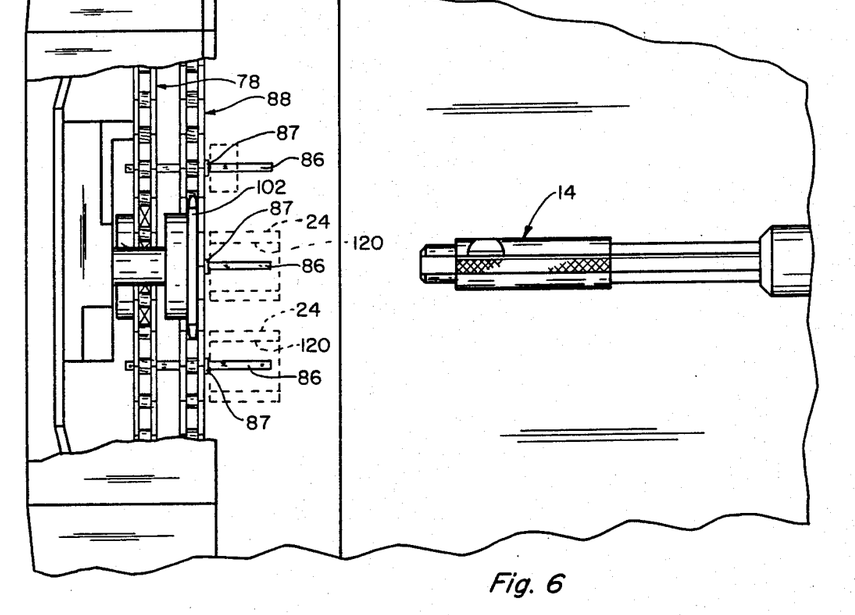
FIG. 6 is a fragmentary top plan view partly broken away of a honing machine with the magazine loading and feeding device of FIG. 1.
Figure 7:
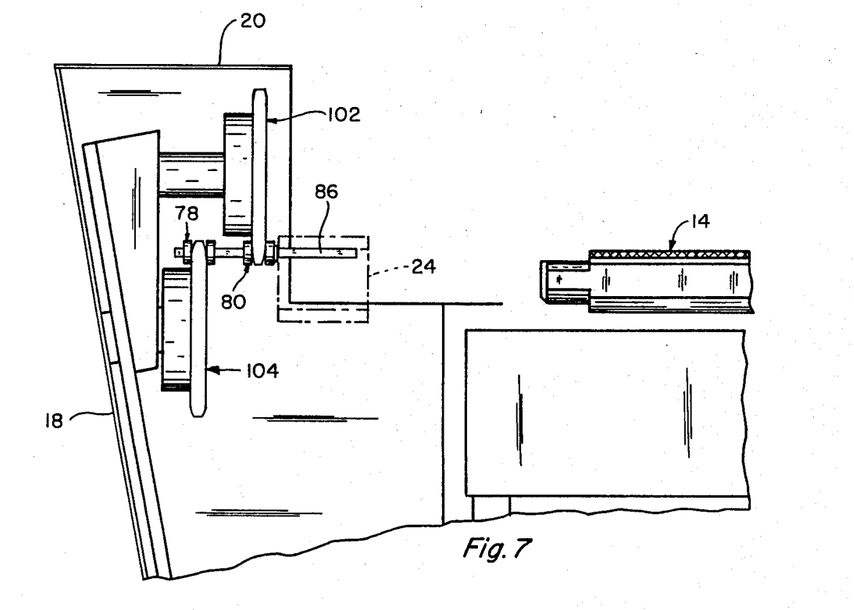
FIG. 7 is a fragmentary side elevational view taken on line 7—7 of FIG. 6.

It should now be clear that all of the sprocket assemblies 54, 56, 62, 68 and 70 are arranged to have their respective gear portion in planes that are parallel to the plane of the wall 18 as shown in FIGS. 1 and 2. In other words, the sprockets are arranged at about 10° to vertical. The full length of the front sprocket chain 80 is visible in FIG. 3 in dotted outline and each of the sprocket chains 78 and 80 is endless and is formed by a plurality of connected links 82 (FIG. 6) which are assembled to form transverse openings 84 where the adjacent links are pivotally connected together along the length of the chains. The openings 84 in the chain 78 are aligned with corresponding openings 84 in the chain 80 and selected ones of these openings are sized to receive workpiece supporting pins 86 such as shown in FIG. 6 which are the portions of the subject mechanism that support the workpieces 24 to be carried and transported thereby. All but one of the pins 86 that extend through aligned openings 84 in the respective chains 78 and 80 tilt outwardly normal to the wall 18 over most of their travel when the sprockets are rotated. The workpieces 24 carried thereby will therefore move or tend to move toward the chain 80 and be held there against and will not be able to work loose and fall off of their pins due to machine vibration or other machine motions. The pins 86 also have collars or staking as at 87 in FIG. 6 to limit their movement through the aligned chain openings 84.

Figure 3:
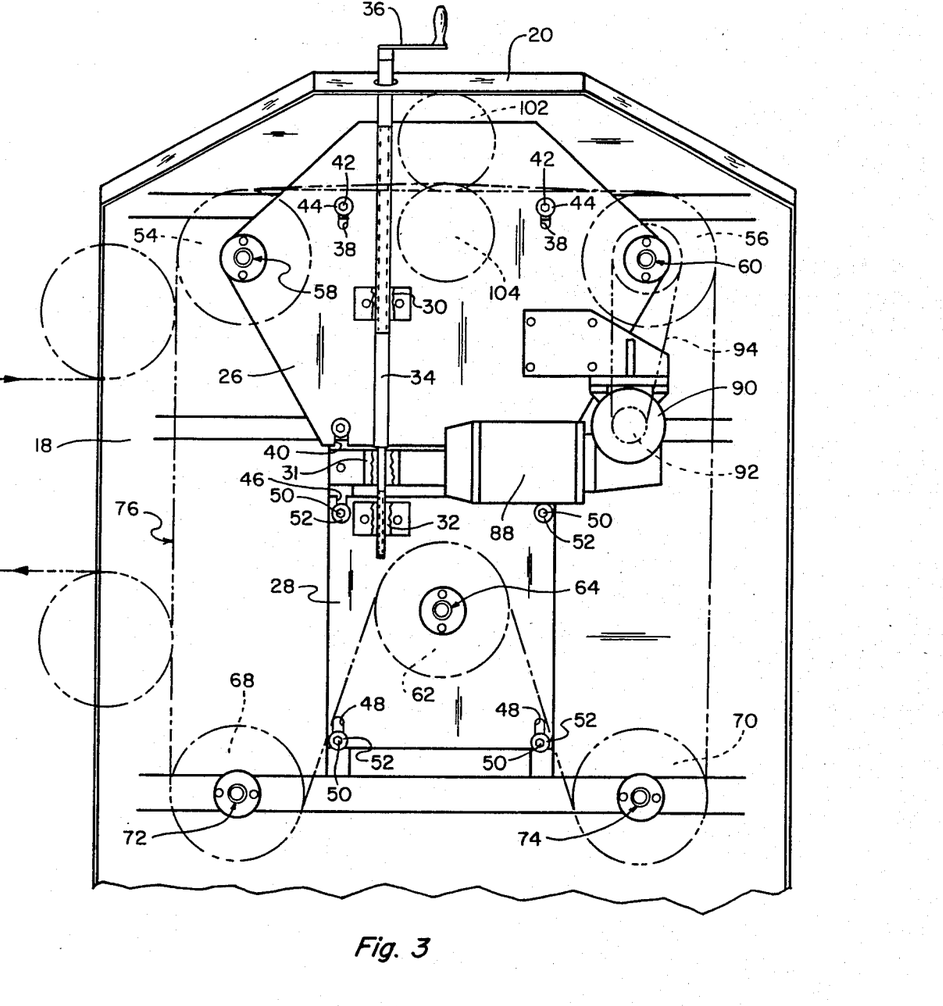
FIG. 3 is a right side view as seen along line 3—3 of the assembly FIG. 2.

Referring to FIG. 3, there is shown a drive motor 88 which has a gear reducer portion 90 and a pulley 92 that is operatively connected by drive belt 94 to another pulley 96 located behind the sprocket assembly 56. When the motor 88 is energized it will rotate the sprocket 56 which in turn will cause the spaced chains 78 and 80 to move along a path extending from the sprockets 56A and 56B to corresponding sprocket portions of the sprocket assemblies 70, 62, 68 and 54.

Figure 4:
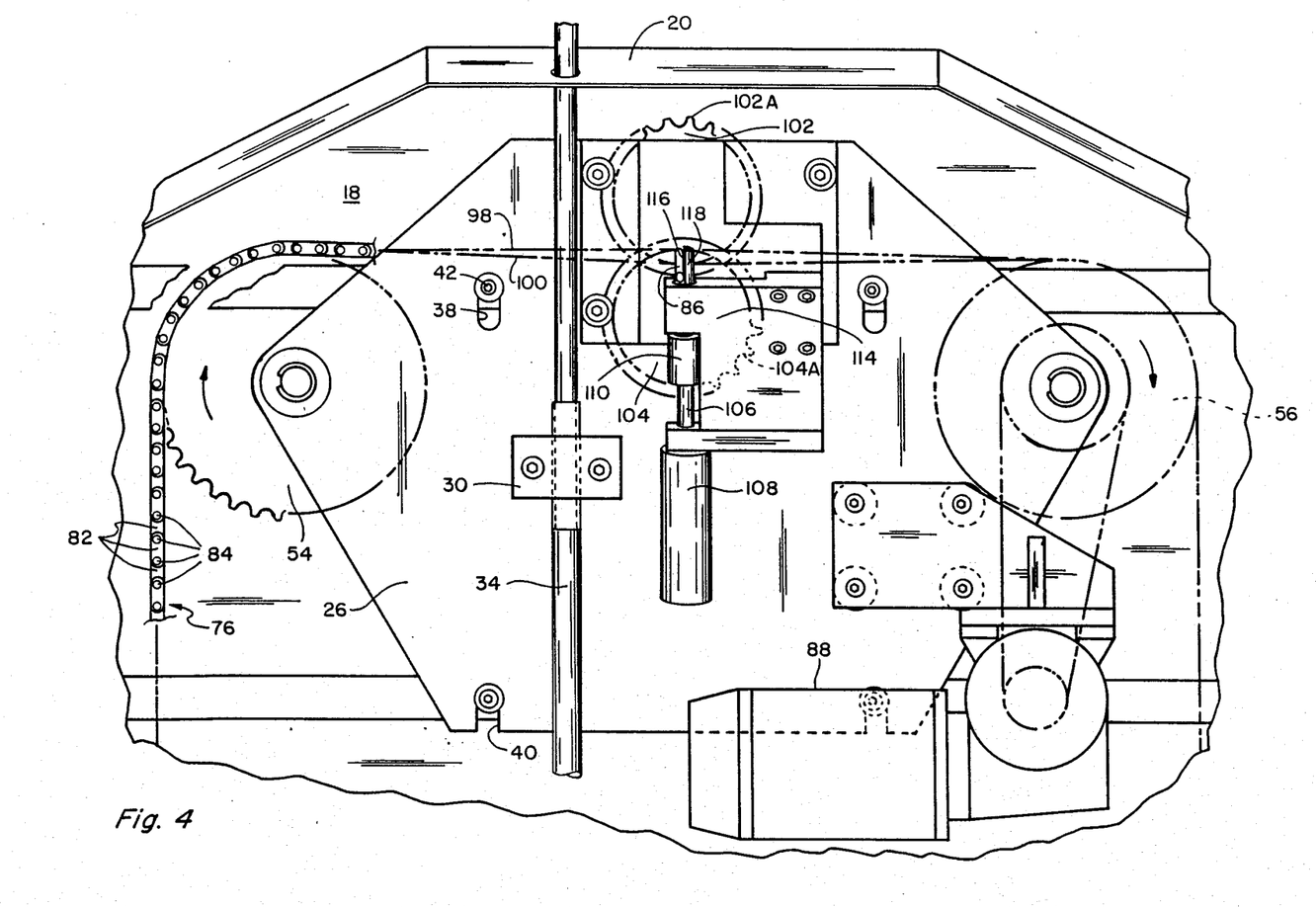
FIG. 4 fragmentary cross-sectional view partly broken away taken along line 4—4 of FIG. 3.

Of special interest to the present construction are the upper spans or reaches 98 or 100 (FIG. 5) of the chains 78 and 80 respectively. These are the spans that extend across the upper portion of the subject device 12 between the sprockets 54 and 56. In FIG. 4 are shown two additional single gear sprockets 102 and 104 which have their respective teeth 102A and 104A oriented to be vertical rather than to be in a plane parallel to the plane of the sloping wall 18. The teeth 102A of the sprocket 102 engage the links of the chain 80 from above pushing the span 100 downwardly and changing its angular orientation by a predetermined amount while at the same time teeth 104A of the rearward sprocket 104 engage the chain 78 from below pushing the span 98 thereof upwardly. The vertical orientation of the sprockets 102 and 104, as stated, causes some angularly twisting of the respective chain reaches so that the upward movement of the chain reach 98 and the downward movement of the chain reach 100 together with the angular twist at the midpoint aligns the holes 84 thereat in the respective chains and the pin 86 supported thereby into a horizontal orientation. This means that the pin 86 located in this particular set of aligned chain holes 84 will have been moved from an orientation which is perpendicular to the sloping wall 18 to an orientation that is horizontal and at some point in precise relationship to the axis of mandrel 14 and/or of a fixture for receiving the workpiece. Thus all of the workpieces 24 carried by the various pins 86 will be maintained in a tilted up position where they will resist the workpieces being carried from coming off except for the particular workpiece 24 located on the pin 86 at the center of the upper chain reaches 98 and 100, and this workpiece will be oriented to have its workpiece axis horizontal so that it can be moved off the pin 86 at this location, as will be described, for movement into honing position on the mandrel 14 or more likely will be gripped by a support fixture which holds the workpiece while it is being honed or machined. Such a fixture is disclosed Vanderwal et al U.S. Pat. No. 4,827,674, issued May 9, 1989.

Figure 5:
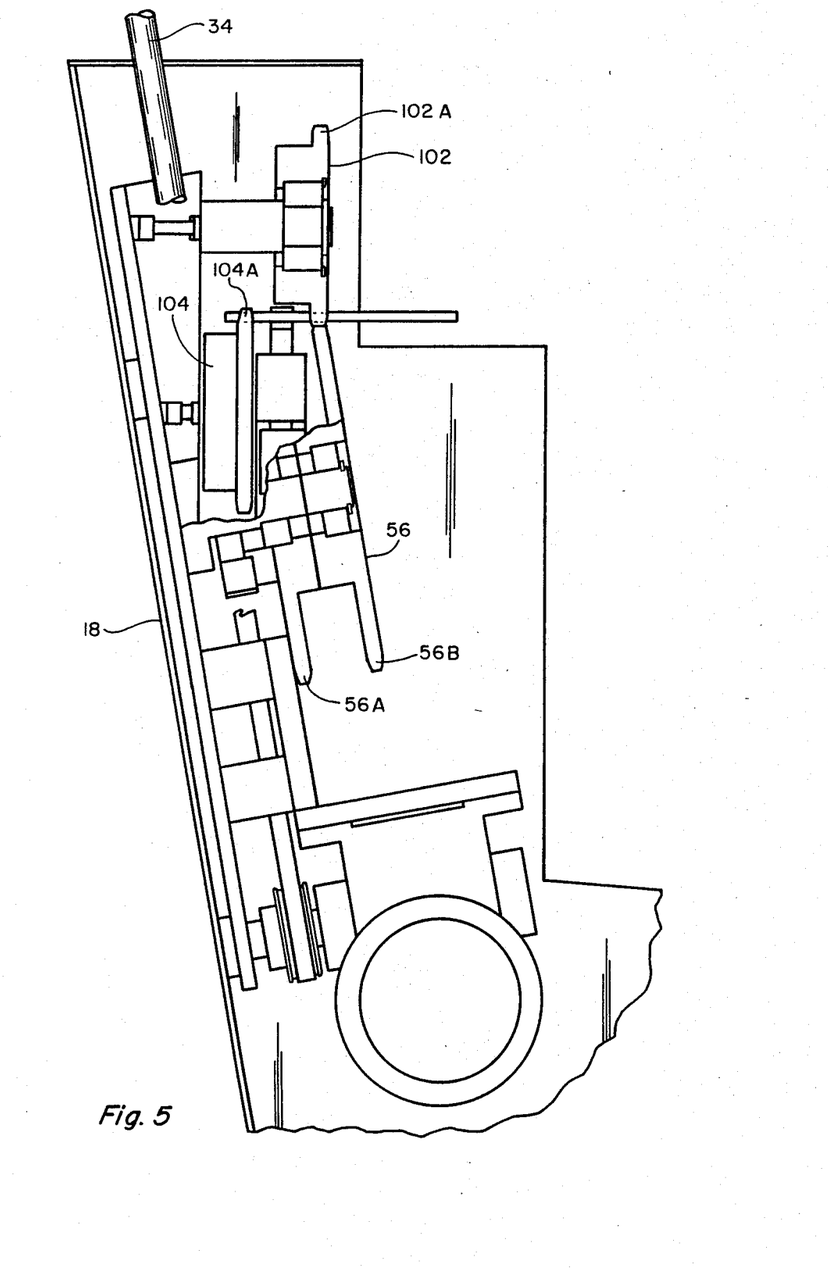
FIG. 5 is a further enlarged fragmentary elevational view of the upper of the magazine shown in FIG. 3.
Figure 8:
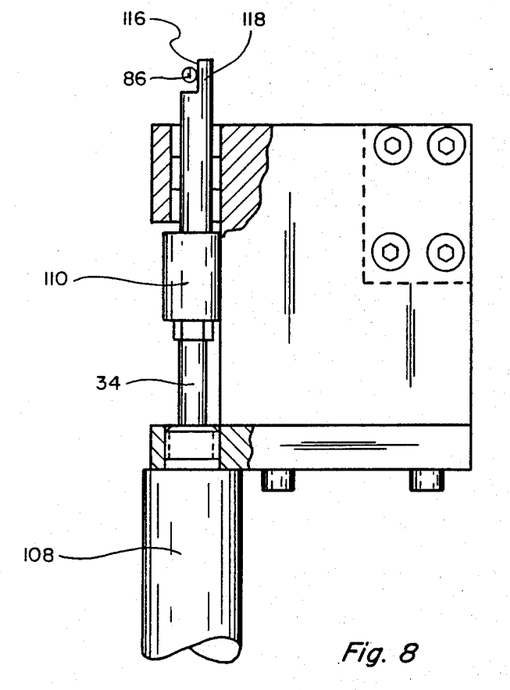
FIG. 8 is an enlarged fragmentary elevational view partly in cross-section showing a workpiece support pin in position to have a workpiece removed therefrom.

FIGS. 5 and 8 show another substantially vertical shaft member 106 which has its lower end extending into a hydraulic or pneumatic cylinder or into a solenoid 108. The shaft extends upwardly from the cylinder or solenoid 108 through a stop collar 110 fixedly attached thereto and through an opening 112 in a fixed block 114. Upper end portion 118 of the shaft 106 is partially cut away to form a flat surface 116 on one side. The upper shaft end portion 118 in one position thereof extends into the space between the chains 78 and 80, and in its upper position the flat surface 116 is engaged by or bumped into by the pins 86 as they move across the upper reaches 98 and 100 of the chains 78 and 80 to accurately locate each pin 86 and the workpiece 24 mounted thereon in vertical axial alignment with the mandrel 14 or gripping fixture as shown in FIG. 1. The shaft 106 is movable between the upwardly extending position shown in FIG. 5 and a lower or retracted position in which the shaft engaging portion 118 is withdrawn downwardly into the bore 112 in the block 114 and into the cylinder 108. In the upward position of the shaft 106 the surface 116 stops a pin 86 as stated in a fixed position and in so doing creates tension on the pin to hold it in position or it may actuate limit switch means or the like (not shown) to cause the drive motor to stop or operate in a stalled mode at reduced power and also to energize means to move the workpiece 24 off the pin or to move a workpiece fixture into position to take hold the workpiece. It is important to note that while in the stopped position the pin 86 on which the workpiece 24 is located is in a horizontal position, and is positioned such that the workpiece bore 120 has its axis oriented to be aligned with the axis of the mandrel 114 and/or the gripping fixture. Thus the pin 86 will always be located above the axis of the bore and mandrel. This is so that the workpiece 24 can be moved horizontally off the pin. This also means that if nonround or odd shaped workpieces are being carried they will all be gravity oriented in the same way. It is also important to understand that workpieces having widely differing bore diameters to be honed or machined can be conveyed and positioned using the subject device. For accommodating bores of differing diameters, however, it will be necessary to relocate the pin 86 in the horizontal position to establish the desired alignment. This means that the vertical position of the pin 86 when in its horizontal position as shown in FIG. 5 must be adjustable to accommodate each different bore diameter to be honed or machined. This is accomplished by means of the hand crank 36 located on the upper end of the adjustment rod 34. When the crank 36 is rotated in one direction the upper plate 26 and the sprocket assemblies 54 and 56 mounted thereon will move vertically as indicated above to relocate the vertical positions of the chain reaches 98 and 100. At the same time the plate 26 is moving in one direction the lower plate 28 will move in an opposite direction and if required, at a somewhat different speed to maintain the chain tension. This is accomplished by having different pitches for the threads used on the rod 34 in the block 30 and in the block 32. Also one of the threads is right handed and the other is left handed. Hence using the crank 36 the subject device can be adjusted to accommodate workpieces having different diameter bores and this can be done simply and expeditiously and by either eyeballing the position of the horizontal pin, measuring the location of the axis of the workpiece relative to the axis of the mandrel or fixture, or by trial and error.

FIG. 8 shows that the block 110 which is attached to the shaft 106 is provided to limit travel of the shaft 106 in the vertical direction so that its upper shaft end portion 118 can be moved into or out of the way of an oncoming pin 86. The electromagnetics, hydraulics or pneumatics used for the cylinder 108 and the controls therefor can be of known construction.

Thus there has been shown and described novel means for supporting workpieces such as workpieces having bores therethrough to be honed or machined in such a manner that the workpieces can be fed one at a time into position for positioning them for grasping by a workpiece fixture or moved onto a mandrel or like device. The present construction fulfills all of the objects and advantages sought therefor including providing a convenient easy to operate and easy to load mechanism for feeding workpieces. It will be apparent to those skilled in the art, however, that many changes, modifications, variations and other uses and applications for the subject device are possible and all such changes, modifications, variations and other uses and applications which do not depart from the spirit and scope of the invention are deemed to be covered by the invention which is limited only by the claims which follow.

What is claimed is:

1. Means for supporting workpieces while feeding them into position to have a surface thereof operated on by a tool rotatable about an axis comprising a support assembly including a canted wall structure located to be intersected at an intermediate location by the axis of rotation of the tool, a plurality of spaced sprocket assemblies mounted on the canted wall structure, each sprocket assembly having a pair of spaced sprockets, an endless chain assembly mounted on the sprocket assemblies for movement when the sprocket assemblies rotate, a reach of said chain assembly extending adjacent to where the axis of the tool intersects the canted wall structure, at least one elongated workpiece support member extending transversely through and from one side of the chain assembly substantially normal to the canted wall structure for supporting a workpiece to be fed, and means to laterally displace a portion of the chain assembly in the reach thereof that extends adjacent to where the axis of the tool intersects the wall structure whereby the elongated workpiece support member thereat is moved from a position normal to the canted wall structure to a position aligned axially with the axis of the tool.

2. The means for supporting workpieces of claim 1 wherein the tool is a honing tool having a honing mandrel rotatable about an axis.

3. The means for supporting workpieces of claim 1 including means to relocate at least some of the sprocket assemblies relative to the canted support wall to relocate the reach of said chain assembly that extends adjacent to where the axis of the tool intersects the canted wall structure in order to align the axis of the workpiece surface with the axis of the tool.

4. The means for supporting workpieces of claim 1 including a pair of spaced plate members for supporting selected ones of the sprockets, and means for moving the plate members in mutually opposite directions to change the relative locations of the sprockets mounted thereon.

5. The means of claim 1 wherein the canted wall structure is oriented to be about 10° from vertical.

6. The means for supporting workpieces of claim 1 wherein the endless chain assembly includes a pair of spaced endless chains each formed by a plurality of hingedly connected links having openings extending transversely therethrough, the elongated workpiece support member including at least one rod member extending transversely through aligned openings in the spaced chains and outwardly from one side thereof.

7. The means for supporting workpieces of claim 6 including means for engaging the elongated workpiece support member that extends through the opening in the spaced chains including means responsive thereto to stop the chains, the elongated support member mounted therein and a workpiece supported thereby in a predetermined position.

8. The means for supporting workpieces of claim 7 wherein said means engageable with the elongated workpiece support member includes means to maintain the elongated member in a predetermined fixed position.

9. A workpiece loading and moving mechanism for feeding workpieces having a surface to be machined to a machine tool having a working member rotatable about an axis, the mechanism comprising a chain drive formed by a plurality of spaced sprockets and an endless chain assembly mounted thereon for movement when the sprockets are rotated, the sprockets and the chain assemblies being oriented in a plane acutely angularly oriented relative to a vertical plane, the endless chain assembly including a pair of spaced endless chains each formed by adjacent links journaled together by means which form aligned transverse openings therethrough, elongated means extending through selected ones of the aligned transverse openings and from one side of the chain assembly to support a workpiece positioned thereon, each of said endless chains having a reach that extends adjacent to the axis of the working member, means for angularly reorienting the spaced chains in said reach whereby the elongated means at least one point in said reach is oriented to be substantially parallel to the axis of the working member and the surface of the workpiece to be machined is aligned axially with the axis of the working member.

10. The mechanism of claim 9 including means to relocate at least some of the sprockets to change the position of the chain reach that extends to adjacent to the axis of the working member to enable the mechanism to accommodate workpieces of different sizes and shapes including different diameters of work surfaces to be engaged by the working member.

11. The mechanism of claim 9 including a wall member on the machine tool canted at an angle of about 10° to the vertical, and means on the wall member for journaling the spaced sprockets thereto.

12. The mechanism of claim 11 wherein the means on the wall member includes a pair of plate members and means for journaling selected ones of the spaced sprockets to each of the spaced plate members.

13. The mechanism of claim 12 including means for simultaneously moving the plate members in mutually opposite directions to change the relative location of the sprockets mounted on the respective plate members.

14. A mechanism for supporting a plurality of workpieces for feeding single file into position to be fed to a machine tool having a working member rotatable about an axis of rotation comprising a pair of spaced endless chains each formed by a plurality of hingedly connected links and means connecting corresponding links of the chains by means for supporting a workpiece by engagement with an internal surface thereon to be machined, means supporting the spaced chains in a plane acutely angularly oriented relative to vertical and to the axis of the working member, each of said chains having a corresponding reach that extends at a location adjacent to the axis of rotation of the working member, means engagable with said corresponding reaches to orient the chains in said corresponding reaches so that the means supporting a workpiece thereat orients the axis of a workpiece surface being supported into a position substantially in alignment with the axis of the working member.

15. A workpiece feeding apparatus comprising a support wall oriented at an acute angle relative to vertical and located to be intersected at an intermediate location by an axis of rotation of a mandrel in a mandrel assembly, the axis of rotation of the mandrel being in a substantially horizontal orientation, spaced sprocket support means mounted on said support wall, a plurality of sprocket assemblies each including a pair of sprocket gears mounted for rotation on each of said sprocket support means and a pair of spaced endless chains mounted in spaced parallel relation on said sprocket assemblies for movement when said sprocket gears rotate, each of said spaced endless chains having a reach extending adjacent to where the axis of rotation of the mandrel intersects said support wall, an elongated workpiece support member extending transversely between and from one side of the pair of chains for supporting a workpiece having a workpiece surface to be operated on, whereby a workpiece is maintained thereon with the help of gravity, and means engageable with the said reach of at least one of the chains to reorient the relative positions of the chains and of the workpiece support member extending therebetween including the axis of the workpiece surface to be operated on to a position wherein the axis of the workpiece surface is aligned with the axis of rotation of the mandrel when the support member is moved by the endless chains to a position adjacent to where the axis of the mandrel intersects said support wall.

16. The workpiece feeding apparatus of claim 15 including means to stop the endless chains when the elongated support member on which a workpiece is positioned is moved to the position wherein the axis of the workpiece surface is aligned with the axis of rotation of the mandrel.

17. The workpiece feeding apparatus of claim 15 including a plurality of spaced elongated workpiece support members extending transversely between and from one side of the endless chains.

18. The workpiece feeding apparatus of claim 15 wherein each of the endless chains has transverse aligned openings therethrough, the elongated workpiece support member being insertable into and removable from any of the aligned chain openings.

* * * * *

UNITED STATES PATENT AND TRADEMARK OFFICE
CERTIFICATE OF CORRECTION

PATENT NO. : 4,886,157
DATED : December 12, 1989
INVENTOR(S) : Robert M. Sunnen et al It is certified that error appears in the above-identified patent and that said Letters Patent is hereby corrected as shown below:

In the Abstract, line 3, "material" should be --mandrel--.

Column 3, line 51, after "to" insert --the teachings of--.

Column 3, line 53, after "intermediate" insert --location--.

Column 3, line 56, after "assembly" insert --shown in--.

Column 3, line 57 after "4" insert --is an enlarged--.

Column 3, line 60, after "upper" insert --portion--.

Column 4, line 66, "acoss" should be --across--.

Column 9, line 1, after "means" insert --at--.

Signed and Sealed this

Twenty-third Day of October, 1990

Attest:

HARRY F. MANBECK, JR.

*Attesting Officer*  *Commissioner of Patents and Trademarks*